United States Patent Office 3,850,996
Patented Nov. 26, 1974

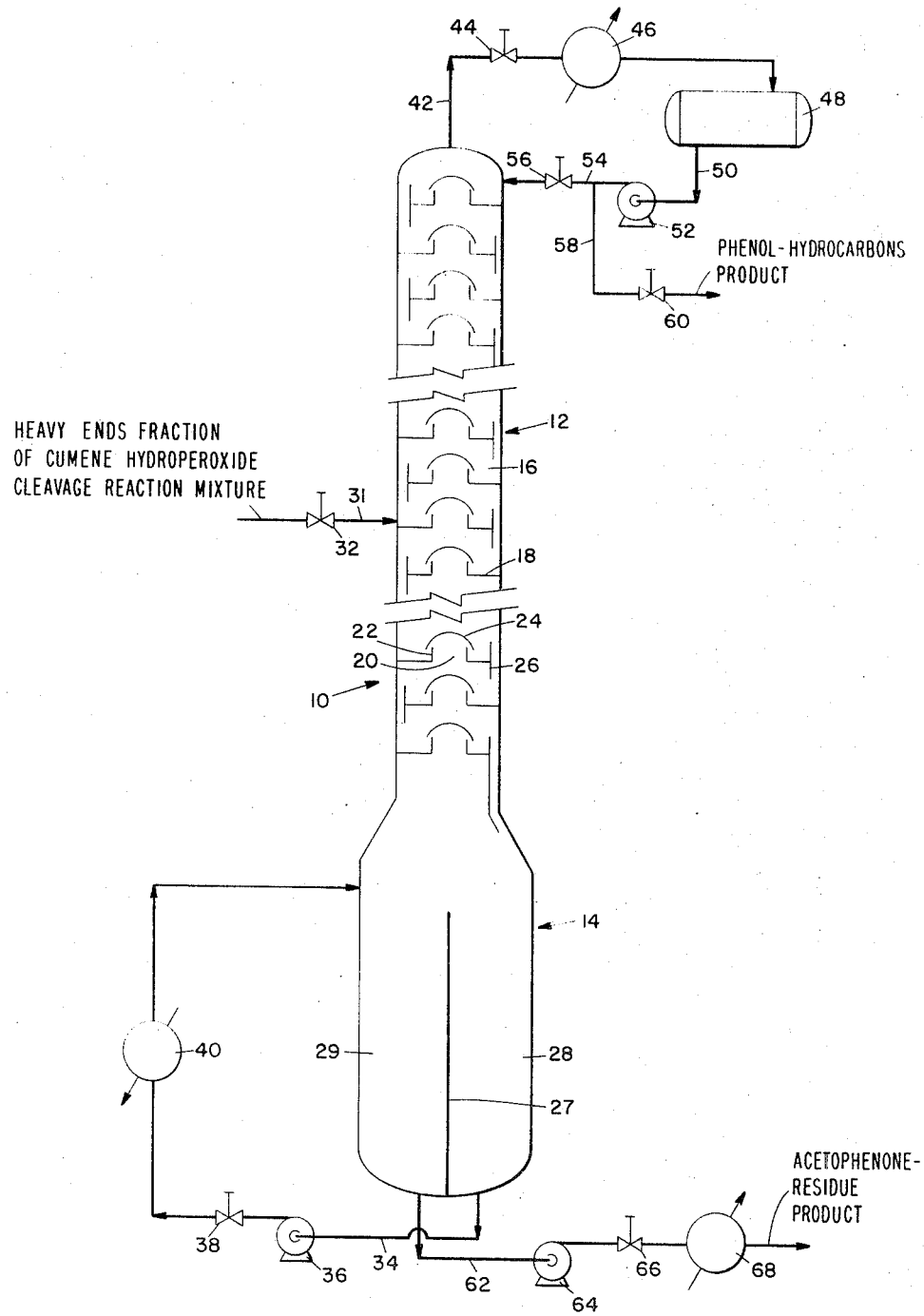

3,850,996
TREATMENT OF THE HEAVY ENDS FRACTION OF CUMENE HYDROPEROXIDE CLEAVAGE REACTION MIXTURE
Joseph R. Nixon, Jr., Wilmington, Del., assignor to Hercules Incorporated, Wilmington, Del.
Filed Oct. 8, 1970, Ser. No. 79,221
Int. Cl. C07c 37/38
U.S. Cl. 260—621 A          7 Claims

ABSTRACT OF THE DISCLOSURE

Disclosed is a process in which components of the heavy ends fraction of cumene hydroperoxide cleavage reaction mixture are pyrolyzed to phenol and hydrocarbons (mainly cumene and $\alpha$-methylstyrene) and phenol and hydrocarbons are separated from the residue of the heavy ends fraction. In a preferred embodiment of the process the heavy ends fraction is introduced into a fractional distillation column having a pot of sufficient size to provide the residence time needed for the desired pyrolysis to occur. The column is operated under superatmospheric pressure and at about 275–420° C. Phenol and hydrocarbons are withdrawn from the top of the column while acetophenone and pyrolysis residue are withdrawn from the bottom of the column.

---

This invention is in the chemical arts. It relates to the cumene hydroperoxide process for the production of phenol and acetone.

In the cumene hydroperoxide process for the production of phenol and acetone, cumene is oxidized to cumene hydroperoxide, and the hydroperoxide is subjected to a cleavage reaction and neutralization procedure, whereby there is obtained a complex liquid reaction mixture comprising acetone and phenol. This mixture, referred to herein as cumene hydroperoxide cleavage reaction mixture, is separated (generally by fractional distillation) into an acetone fraction and a phenol fraction.

The acetone fraction is treated, usually by a series of fractional distillations, to obtain acetone of the desired purity. In such treatment there is obtained a hydrocarbons fraction, the main hydrocarbon components of which are cumene and $\alpha$-methylstyrene. The hydrocarbons fraction is treated to recover the cumene which is returned to the oxidation step. In some instances the $\alpha$-methylstyrene is treated to convert it into cumene which is likewise returned to the oxidation step.

The phenol fraction is treated, again usually by a series of fractional distillations, to obtain phenol of the desired purity. In the first step of such treatment the phenol fraction is separated by fractional distillation into an overhead crude phenol product and a bottoms fraction.

The bottoms fraction, referred to herein as the heavy ends fraction of cumene hydroperoxide cleavage reaction mixture, is a complex mixture composed of phenol, acetophenone and other high boiling oxidation and cleavage reaction products as well as derivatives thereof formed during the various separation steps.

Heretofore in one embodiment of the cumene hydroperoxide process the heavy ends fraction has been pyrolyzed at, for example, 300–400° C. to give an overhead fraction comprising phenol, acetophenone and hydrocarbons (mainly cumene and $\alpha$-methylstyrene) and a tar-like bottoms product comprising the pyrolysis residue. The overhead fraction has been fractionally distilled to give overhead composed mostly of phenol and hydrocarbons, and a bottom fraction composed of phenol and acetophenone. The overhead generally is returned to the process by a route such that the hydrocarbons therein ultimately join the hydrocarbons fraction from the acetone fraction treatment in its return as described above to the oxidation step. Because the bottom fraction is a maximum boiling azeotrope, separation of phenol from the fraction heretofore has generally been effected by an extraction procedure employing an aqueous solution of sodium hydroxide as the extracting agent.

This invention provides a process for the treatment of the heavy ends fraction in which the heavy ends fraction is pyrolyzed, and at the same time phenol substantially free of acetophenone is recovered without going through an extraction procedure.

In summary, this invention, broadly considered, comprises a process for treating the heavy ends fraction of cumene hydroperoxide cleavage reaction mixture to obtain therefrom a product comprising hydrocarbons and phenol with the weight ratio of acetophenone to phenol in the product being substantially less than the weight ratio of acetophenone to phenol in the heavy ends fraction. The process comprises establishing and maintaining said fraction (a) in the range of temperatures at which pyrolysis of the pyrolyzable portion of said fraction to phenol and hydrocarbons occurs (b) at substantial superatmospheric pressure (c) for a period of time sufficient for substantial pyrolysis of the pyrolyzable portion of said fraction to phenol and hydrocarbons to occur, whereby said product is formed as a vapor, and removing said vaporous product from the residue of said fraction.

One of the important conditions in the process of this invention is substantial superatmospheric pressure. It is important because in the absence of superatmospheric pressure the weight ratio of acetophenone to phenol in the phenol-hydrocarbons product is the same as in the heavy ends fraction. Superatmospheric pressure results in the substantial reduction of this ratio in the phenol-hydrocarbons product. In general, satisfactory results are obtained when the superatmospheric pressure is 5–50 p.s.i.g. (pounds per square inch—gauge) with optimum results being obtained at 25–40 p.s.i.g. Higher and lower superatmospheric pressures, however, are within the broader concepts of this invention.

Another important condition in the process of this invention is temperature. In general, the range of temperatures at which pyrolysis of the pyrolyzable portion of the heavy ends fraction to phenol and hydrocarbons occurs is about 275–420° C. At temperatures below 275° C. pyrolysis is too slow to be practical, while at temperatures above 420° C. pyrolysis becomes extreme, resulting in the formation of substantial quantities of coke, which is to be avoided. However, such lower and higher temperatures as are operable are within the broader concepts of this invention. Optimum results are obtained in the range of temperatures of about 315–325° C.

Still another important condition is the length of time in which the pyrolyzable portion of the heavy ends fraction and the resulting pyrolysis residue are established and maintained in the range of pyrolysis temperatures. In general, the higher the temperature the shorter is the period of time to obtain the desired extent of pyrolysis, while the lower the temperature the longer is the period of time to obtain the desired extent of pyrolysis. In this connection, the longer the pyrolyzable portion of the heavy ends fraction and the resulting pyrolysis residue are maintained at higher temperatures, particularly at temperatures above about 350° C., the more extreme the pyrolysis reaction becomes and the more coke is formed, which is to be avoided. With these considerations in mind, generally the period of time the pyrolyzable portion of the heavy ends fraction and the resulting pyrolysis residue are established and maintained in the range of pyrolysis temperatures is in a range from about 5 to about 100 hours. However, lesser and greater operable periods of time are within the broader concepts of this invention. A preferred range of time when the heavy ends fraction is established and maintained at about 315–325° C. is about 10–70 hours.

A preferred embodiment of this invention is a continuous process in which the heavy ends fraction is introduced into a fractional distillation column having a pot for receiving and holding for a period of time the pyrolyzable portion of the heavy ends fraction. The contents of the column are established and maintained under superatmospheric pressure and at 275–420° C. The pot size, the rate of introduction of heavy ends fraction into the column, and the rate of withdrawal of bottoms product from the column are correlated to give a hold time or residence time in the column of the pyrolyzable portion of the heavy ends fraction and resulting pyrolysis residue of 5–100 hours. Under these conditions the heavy ends fraction is separated in the column into an overhead product comprising phenol substantially free of acetophenone, and a bottoms product. In addition, the pyrolyzable portion of the heavy ends fraction is pyrolyzed and the pyrolysis products resulting therefrom, which are in the gaseous state under these conditions, are withdrawn from the column as part of the overhead product. The pyrolysis residue is withdrawn along with the acetophenone in the bottoms product.

The best mode now contemplated of carrying out this invention is illustrated by the drawing which forms a material part of these disclosures, and which shows a simplified flow sheet for carrying out a preferred specific embodiment of the process of this invention.

More particularly, the drawing displays a flow sheet in which pertinent sections of a multiple plate distillation tower or column 10 are diagrammatically shown. The column 10, formed by a cylindrical casing, has an upper fractional distillation zone 12 and a lower pyrolysis or cracking zone 14.

The upper fractional distillation zone 12 in one general preferred embodiment is subdivided horizontally into superposed stages or compartments 16 by horizontally disposed, vertically spaced plates or trays 18. In the specific embodiment of the column depicted in the drawing, each tray 18 is provided with at least one opening 20 in combination with an upriser 22 and a bubble cap 24 for delivering vapor from below the tray to above the tray and bubbling it into the liquid that collects on the tray. Generally each tray has a plurality of such openings uniformly spaced with uprisers and bubble caps. Each tray is provided with at least one downcomer 26 which establishes in the compartment a normal liquid overflow level, and which delivers liquid overflow from each compartment to each subjacent compartment. The normal liquid overflow level of each compartment is sufficiently above the level at which vapor emerges from under the bubble cap or caps 24 into the compartment to give the desired vapor-liquid contact, but sufficiently below the top of the compartment to minimize liquid entrainment by vapor ascending through each upriser into the superjacent compartment.

In another specific embodiment of the column each tray 18 is a sieve plate which is perforated sufficiently to permit passage therethrough of vapor below the tray. In this embodiment each tray is provided with at least one downcomer 26 for the same purpose as described above.

In still another specific embodiment of the column each tray 18 is a sinuous or ripple-like sieve plate which is perforated sufficiently to permit the downflow of liquid that collects on the plate, and the upflow of vapor from below the plate.

In another general, but less preferred, embodiment the upper fractional distillation zone 12 is formed by packing.

The lower pyrolysis zone 14 is formed by a pot-like structure of size sufficient to hold that portion of the heavy ends fraction reaching the bottom of the column and the pyrolysis residue thereof for the period of time selected according to the desired extent of pyrolysis. To minimize short-circuiting of liquid entering the pyrolysis zone 14 to the discharge outlet at the bottom of the column 10, a vertically disposed baffle 27 in the pot is provided. The baffle in the specific embodiment shown vertically divides the pyrolysis zone 14 into two sections, a receiver section 28 and a discharge section 29, with the receiver section 28 being located to receive substantially all of the liquid flowing down from the upper distillation zone 12, and with the discharge section 29 having at its bottom the discharge outlet. The height of the baffle is such that liquid in the discharge section 29 can overflow the top of the baffle into the receiver section 28.

Under normal operative conditions in the embodiment of this invention depicted by the drawing, liquid heavy ends fraction is continuously introduced into an intermediate compartment of the upper fractional distillation zone 12 by way of a feed conduit 31 provided with a flow control valve 32. Liquid reaching the bottom of the receiver section 28 of the pyrolysis zone 14 is withdrawn therefrom through an outlet by means of a circulation conduit 34 provided with a pump 36 and a flow control valve 38, and pumped through a heat exchanger 40 into the upper portion of the discharge section 29 of the pyrolysis zone 14. In the heat exchanger 40 enough heat is added to the liquid to establish and maintain the desired temperature conditions throughout the column 10. Under these conditions part of the liquid in the pyrolysis zone 14 and part of the heavy ends fraction in the upper fractional distillation zone 12 vaporize and rise through the column.

Vapor that collects in the top compartment of the fractional distillation zone 12 is withdrawn at an overhead outlet through an overhead discharge conduit 42 with a flow control valve 44, and is conveyed thereby through a condenser 46 in which it is condensed, and into a storage tank 48. The storage tank is established and maintained, for example, by an inert gas, under superatmospheric pressure. Liquid is withdrawn through an outlet at the bottom of the tank and passed by a tank withdrawal conduit 50 to the intake of a pump 52. The outlet of the pump 52 is joined to a liquid overhead return conduit 54 with a flow control valve 56, which returns as reflux part of the condensed overhead into the top part of the fractional distillation zone 12. A liquid overhead product discharge conduit 58 with a flow control valve 60 is joined to the liquid overhead return conduit 54 for withdrawal from the process as product the remainder of the condensed overhead, which under normal operative conditions can be, and in one cumene hydroperoxide process is, added to the cleavage reaction mixture prior to separation into an acetone fraction and a phenol fraction.

In the meantime the pyrolyzable portions of the liquid flowing downwardly through the fractional distillation zone 12, and of the liquid in the two sections 28 and 29 of the pyrolysis zone 14 are pyrolyzed to phenol and to hydrocarbons such as cumene and α-methylstyrene. These products of pyrolysis pass upwardly through the fractional distillation zone 12 and ultimately out of the column 10 in the overhead. Acetophenone and pyrolysis residue collect in the discharge section 29 of the pyrolysis zone 14 and are withdrawn through the discharge outlet at the bottom of the column 10 into a bottom discharge conduit 62 having a pump 64 and flow control valve 66, pumped through a heat exchanger 68 to recover heat therefrom, and sent to waste.

A typical preferred column 10 for carrying out the process of this invention has 35 trays in the fractional distillation zone 12. The heavy ends fraction is introduced by the heavy ends feed conduit 31 into the fractional distillation zone compartment bottomed by the twelfth tray below the top of the column. Temperature of the contents of the pyrolysis zone 14 is established and maintained at about 320° C. while the pressure at the top of the column is established and maintained at about 35 p.s.i.g. The size of the column 10 in the pyrolysis zone 14, that is, the size of the pot, the rate of introduction of heavy ends fraction into the column 10 and the rate of withdrawal of acetophenone-pyrolysis residue from the bottom of the column are correlated to give a residence time of the pyrolyzable portions of the heavy ends fraction and pyrolysis residue in the column of about 50 hours. Under these conditions typical normal steady state flow rates in pounds per hour of the components of the streams in the feed conduit 31 and product withdrawal conduits 58 and 62, and a typical normal steady state flow rate of liquid overhead returned as reflux in conduit 54 are as set forth in the following table. In the table the components are listed downwardly in the order of their boiling points at atmospheric pressure when pure, with the lowest boiling point component being first and the highest boiling point component being last. Typical normal steady state flow rates of the streams through the reflux conduit 54 and pot recirculation conduit 34 are also presented in the table.

the bottom of the column a liquid acetophenone-pyrolysis residue fraction at a rate selected to give a residence time of the pyrolyzable portion of said heavy ends fraction and the pyrolysis residue thereof of about 5–100 hours.

2. A process according to claim 1 in which the contents of the column are established and maintained at about 35–40 p.s.i.g.

3. A process according to claim 2 in which the contents of the pyrolysis zone are established and maintained at about 315–325° C.

4. A process according to claim 3 in which said residence time is about 10–70 hours.

5. A process according to claim 4 in which the contents of said pyrolysis zone are established and maintained at about 315–325° C. by conducting a portion of the liquid content of said pyrolysis zone through a heat exchanger in which heat is added thereto, and back into said pyrolysis zone.

TABLE

| Components | Feed (conduit 31) | Phenol-hydrocarbons product (conduit 58) | Reflux (conduit 54) | Pot Recirculation (conduit 34) | Acetophenone-residue product (conduit 62) |
|---|---|---|---|---|---|
| Water | 0 | 82 | 656 | | 0 |
| Cumene | 0 | 695 | 5,560 | | 0 |
| α-Methylstyrene | 0 | 296 | 2,368 | | 0 |
| Phenol | 630 | 1,218 | 9,744 | | 28 |
| Acetophenone | 380 | 5 | 40 | | 375 |
| α,α-Dimethylbenzyl alcohol | 370 | 0 | 0 | | 0 |
| p-Cumylphenol | 1,670 | 0 | 0 | | 0 |
| Residue | 1,030 | 0 | 0 | | 1,381 |
| Total | 4,080 | 2,296 | 18,368 | 175,000 | 1,784 |

These flow rates are established and maintained, for example, by means of the various flow control valves.

A feature of advantage of the process of this invention, compared to the prior art process, is the simplified equipment and material requirements. Whereas, in the prior art process a cracking column with associated pumps and piping, and a separate fractional distillation column with associated pumps and piping are employed, in the process of this invention only one column with associated pumps and piping is required.

Another feature of advantage of the process of this invention is that separation of phenol from acetophenone is effected without extraction.

Other features, advantages and specific embodiments of this invention will become readily apparent to those exercising ordinary skill in the art after reading the foregoing disclosures. These specific embodiments are within the scope of the claimed subject matter unless otherwise expressly indicated to the contrary. Also, while a specific embodiment of this invention has been described in considerable detail, variations and modifications of this embodiment can be effected without departing from the spirit and scope of the invention as disclosed and claimed.

What I claim and desire to protect by Letters Patent is:

1. A continuous process for treating the heavy ends fraction of cumene hydroperoxide cleavage reaction mixture to recover therefrom hydrocarbons and phenol substantially free of acetophenone, which comprises: introducing said heavy ends fraction into a distillation column having an upper fractional distillation zone and a lower pyrolysis zone, establishing and maintaining the contents of said column at about 275–420° C. and at about 5–50 p.s.i.g.; withdrawing vaporous phenol-hydrocarbons fraction from the top of said column; and withdrawing from 6. A process according to claim 5 in which the heavy ends fraction is introduced into the column at an intermediate stage of the upper fractional distillation zone.

7. A process according to claim 6 in which the withdrawn phenol-hydrocarbons fraction is condensed and part of the condensed fraction is returned as reflux to the upper fractional distillation zone.

References Cited
UNITED STATES PATENTS

| | | | |
|---|---|---|---|
| 2,728,795 | 12/1955 | Armstrong et al. | 260—621 R |
| 2,715,145 | 8/1955 | Bewley et al. | 260—621 C |
| 2,736,753 | 2/1956 | Jacobs | 260—621 C |
| 2,671,809 | 3/1954 | Fortuin et al. | 260—621 C X |
| 2,628,983 | 2/1953 | Allen et al. | 260—621 C |
| 3,365,375 | 1/1968 | Nixon | 260—621 C X |
| 3,187,052 | 6/1965 | Nelson et al. | 260—621 C X |
| 3,110,744 | 11/1963 | Wald et al. | 260—621 C X |

OTHER REFERENCES

Moore: "Physical Chemistry," 3rd Edition, pp. 140–141 (1962).

Horsley et al.: "Azeotropic Data," No. 6, "Advances in Chemistry Series," pp. 168, 318–322 (1958).

Lecat: "Ann. Soc. Sci. Bruxelles," 45, I, p. 228 (1925).

LEON ZITVER, Primary Examiner

N. MORGENSTERN, Assistant Examiner

U.S. Cl. X.R.

203—91; 260—669 A, 674 A